Figure 1:
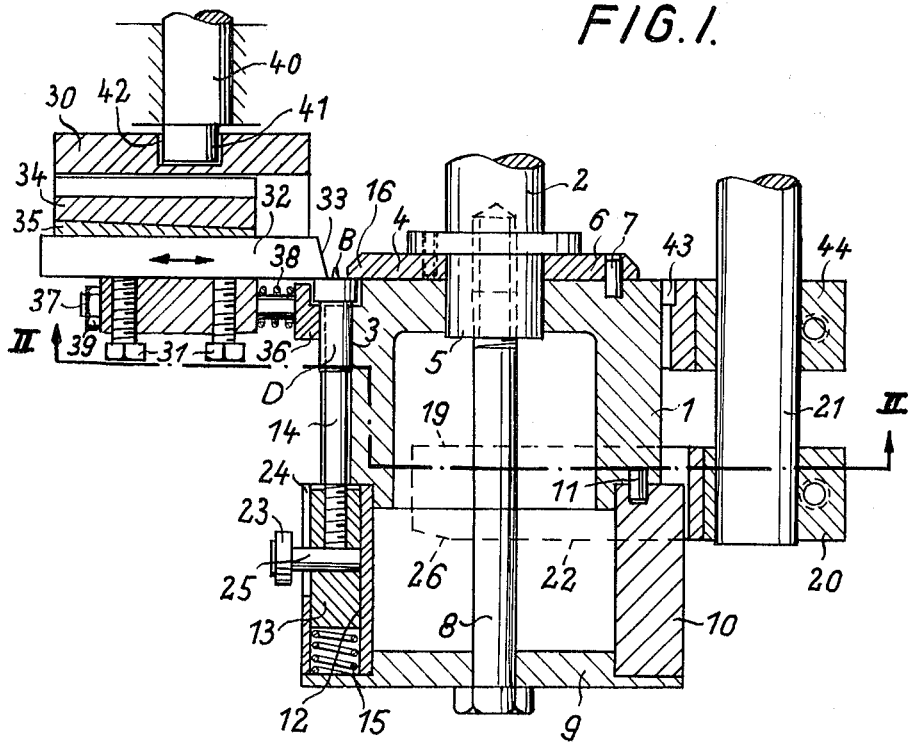

May 24, 1966   E. NANN   3,252,367

APPARATUS FOR REMOVING NIPPLES FROM TURNED WORKPIECES

Filed Dec. 19, 1963

INVENTOR.
ERWIN NANN
BY SPARROW and SPARROW
ATTORNEYS

United States Patent Office 3,252,367
Patented May 24, 1966

3,252,367
APPARATUS FOR REMOVING NIPPLES FROM TURNED WORKPIECES
Erwin Nann, Mulbergstrasse 59, Esslingen (Neckar), Germany
Filed Dec. 19, 1963, Ser. No. 331,673
Claims priority, application Germany, Dec. 20, 1962, H 47,752
8 Claims. (Cl. 83—267)

The present invention relates to an apparatus for removing the projecting nipples which usually remain on the end surfaces of solid rod-shaped workpieces when they are cut off on an automatic lathe or similar machine. These undesirable projections generally have a diameter which depends upon the weight of the workpiece which is cut off from the part which is clamped in the lathe and upon the quality of the cutting tool.

In order to prevent such nipples from being formed it has been customary to provide the machine with a collet which runs synchronously with the work spindle and grips the workpiece shortly before it is cut off from the part which is clamped in the machine. Such supporting collets are usually provided in automatic multiple-spindle machines and sometimes also in long-turning automatic lathes, whereas in automatic turret machines they cannot be applied.

For removing the nipples, different methods are employed. The best results although at the greatest expense are attained by finishing the end surface of the workpiece carrying the nipple on a finishing lathe. Sometimes, these nipples are simply pressed flat in a press, but more frequently they are removed manually in a vice or they are ground off on a grinding belt. None of these methods can be regarded as satisfactory.

It is an object of the present invention to provide a new method of removing such nipples from cut-off workpieces which overcomes the disadvantages of the methods which have previously been employed and avoids especially the time-wasting effort of clamping each individual workpiece by hand and also the fact that the quality of the work depends upon the manual skill of the worker. For attaining this object the present invention provides an apparatus for shearing off these projecting nipples which comprises a cylinder which is rotatable about its horizontal axis and connected to suitable driving means and provided with a plurality of workpiece holders which are equally spaced from each other on the peripheral surface of the cylinder and consist of grooves in this surface which extend parallel to the axis of the cylinder, have a size and shape in accordance with the contours of the workpieces and are open toward the outside at one end surface of the cylinder where the ends of the workpieces carrying the nipples are located. When the cylinder is rotated, these grooves travel successively past a feeding position for the workpieces which is located above the cylinder and past a cutting position which is offset relative to the feeding position by the angular distance between two adjacent grooves. The apparatus further comprises a pressure pin which, when the workpiece in its groove of the cylinder moves toward the cutting position, is movable longitudinally in each groove under the action of a spring to press upon the rear end of the workpiece and thereby clamps its front end carrying the nipple against a stop member on the cylinder which projects partly over the edge of the open end of the groove. Prior to and after the cutting position the pressure pin releases the workpiece by engaging with and sliding along a stationary cam member against the action of the mentioned spring. The apparatus according to the invention further comprises a common drive member which, in turn, is driven by the drive mechanism of the cylinder and is adapted to reciprocate a resilient clamping jaw in the radial direction of the cylinder for clamping the workpiece in its groove in the cylinder while the workpiece is near the cutting position in which the nipple is to be shorn off, and for also reciprocating a cutting tool so that its cutting edge will move within the plane of the end surface of the cylinder and across the end surface of the workpiece which is flush with the end surface of the cylinder so as to shear off the projecting nipple.

When the individual work-holding grooves in the cylinder move past a feeding position, the workpieces may be fed into them successively either automatically from a magazine or by hand. Thereafter the workpieces travel past the cutting position in which the projecting nipples are automatically shorn off. During the further movement of the cylinder when the grooves are at the lower side thereof, the finished workpieces drop out of the grooves by their own gravity.

These and various other features and advantages of the present invention will become more clearly apparent from the following detailed description thereof which is to be read with reference to the accompanying drawings, in which—

Figure 2:
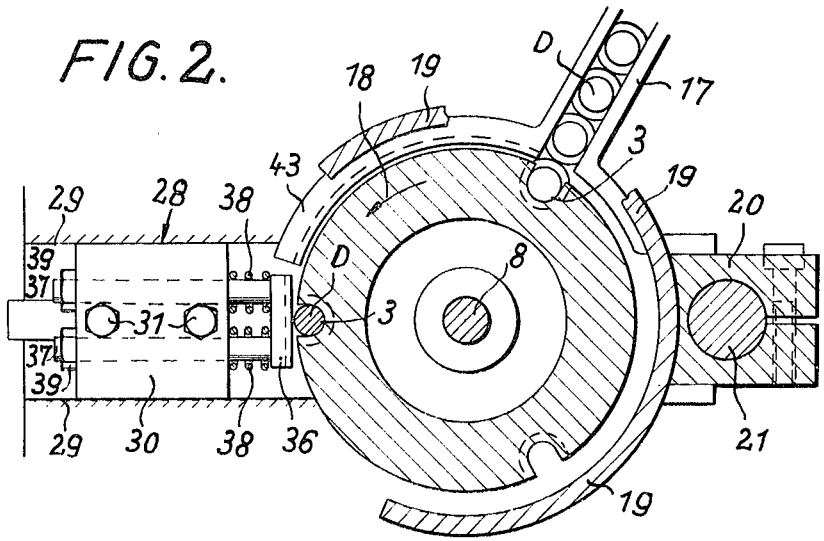

FIGURE 1 shows a horizontal longitudinal section of the apparatus which is taken along the axis of the cylinder and through the tool holder; while FIGURE 2 shows a cross section which is taken along the line II—II of FIGURE 1.

As illustrates in the drawings, the apparatus according to the invention comprises a drum-shaped cylinder 1 which is preferably made of cast iron and connected in a manner as subsequently described to the drive shaft 2 of a drive mechanism, not shown, which may consist, for example, of an electric motor and a worm gearing. Cylinder 1 extends in a horizontal direction and its outer peripheral surface is provided with a plurality of equally spaced grooves 3, for example, three grooves, which form workpiece holders and extend parallel to the axis of the cylinder and have a contour in accordance with that of the workpieces D. In the particular embodiment of the invention as illustrated, these workpieces consist of screws the heads of which carry the nipple-like projections B which are to be removed. In accordance with the shape of these screws, the grooves 3 are formed by two recesses of a different width and depth and they terminate toward the outside at the end surface 4 of the cylinder facing the side where the driving means are located. This end surface 4 of the cylinder is flush with the end surfaces of the workpieces carrying the projecting nipples.

Cylinder 1 may be fitted over an end portion 5 of the drive shaft 2 so that its end surface 4 abuts against and may be clamped upon a disk 6 which is rigidly connected to the shaft 2. Cylinder 1 is locked in a certain rotary position to the drive shaft by means of a setpin 7 which engages into the disk 6 and the cylinder 1, and the cylinder is clamped in the axial direction tightly against disk 6 by means of a clamping bolt 8 which may be screwed into an axial bore in shaft 2 and by a clamping disk 9, whereby at the same time a thick-walled ring 10 is clamped against the rear side of the cylinder. This ring 10 is also fixed in a certain rotary position to the cylinder 1 by a setpin 11 and its wall is provided with bores 12 which extend parallel to the axis of the ring and are in alignment with the grooves 3 in cylinder 1. In the wall of each of these bores 12 a slide member 13 is guided into which an exchangeable pressure pin 14 which projects into the respective groove 3 of cylinder 1 is screwed. Slide member 13 is acted upon by a spring 15 and is thereby shifted together with the pressure pin 14 in the direction toward the workpiece in groove 3 so that the pressure pin will press the workpiece against a stop member 16 which overlaps the front end of groove 3 at the front side 4 of the cylinder to a point near the nipple B on the end of the workpiece D. Instead of providing a separate stop member 16 for each work holding groove 3, they may all be formed by an edge portion of disk 6.

Before the turned workpieces coming from an automatic lathe can be fed at a feeding position 17 successively into one after another of the work-holding grooves 3 of the cylinder, it is first necessary to retract the pressure pin 14 which is associated with each groove so that the workpieces can drop freely into the grooves 3. For effecting this retracting movement, a roller 23 is rotatably mounted on the outer end of a pin 25 which is secured in the slide member 13 and extends radially to the axis of the cylinder through a slot 24 in the wall of each of the bores 12 in ring 10 to the outside. When during the rotation of cylinder 1 in the direction of the arrow 18, as shown in FIGURE 2, one of the grooves 3 has traveled past the cutting position 28, roller 23 runs up on an inclined end portion 26 on the rear side of a stationary cam or guide member 19 and thereby retracts the pressure pin 14 against the action of spring 15. This cam member 19 extends in the form of a sector around the cylinder 1 and is secured by a clamp 20 to a rod 21 which extends parallel to the axis of the cylinder. Each roller 23 then rolls along cam member 19 past the feeding position 17 to the other inclined end 26 thereof near the cutting position 28 and maintains the associated pressure pin 14 in the retracted position during this entire travel. The turned workpieces D from each of which a projecting nipple is to be shorn off are fed to cylinder 1 from a point above the latter through a feed channel 17 which extends radially to the cylinder and terminates at a short distance therefrom. Thus, whenever one of the three grooves from which the pressure pin 14 is retracted passes the feeding position 17, one of the turned workpieces will drop into this groove. Even though during its subsequent movement from the feeding position 17 to the cutting position 28, the workpiece D remains by its own gravity in one of the grooves 3, it may be advisable to provide an additional sector-shaped guide member 43 which extends concentrically to and around cylinder 1 to a point closely adjacent to the working position 28 and may be clamped by a clamp 44 upon the same stationary rod 20 which also carries the clamp 20 holding the guide member 19. This guide member 43 insures that the workpieces will be properly located in grooves 3 and that they will not be thrown out by centrifugal action.

The cutting position 28 is located at a certain distance from the feeding position 17, that is, in the present case at an angle of 120° therefrom. At this position 28 a tool holder 30 is mounted so as to be slidable within guide means 29 in a radial direction toward the axis of cylinder 1. This tool holder 30 is adapted to receive a cutting tool 32 which may be clamped therein by a pair of screws 31, and the tool holder is designed so that when it is moved forwardly the cutting edge 33 of the tool 32 will be moved within the plane of the end surface 4 of the cylinder and will therefore slide along the end surface of the workpiece which is clamped by the pressure pin 14 in its axial direction against the stop member 16. For accurately adjusting the tool to this position, wedges 34 and 35 are provided in a conventional manner in the channel of the tool holder 30. When the workpiece moves into the area of the cutting position 28, the cutting edge 33 of the tool will move toward the axis of the cylinder to a point beyond the axis of the workpiece D and will thereby shear off the nipple B from the end surface of the workpiece.

In order to prevent the workpiece D from tilting in the work holding groove 3 when the nipple is being shorn off, the tool holder 30 is connected to a resilient clamping jaw 36 which exerts a clamping action upon the workpiece in the groove 3 in the radial direction toward the cylinder axis. This jaw 36 is mounted on a pair of parallel rods 37 which are slidable in the body of the tool holder 30 and it is acted upon by a spring 38 in the direction toward the periphery of the cylinder. The distance of the movement of the clamping jaw 36 in this direction is, however, limited by stop nuts 39 which are screwed upon the rear ends of rods 37 so as to insure that this jaw 36 can act upon the workpiece only at the moment when the cutting edge 33 of tool 32 passes beyond the axis of the workpiece and exerts a shearing action.

The reciprocating movements of the tool holder 30 are produced by a shaft 40 which is driven by the drive mechanism of cylinder 1 and is provided with an eccentric end 41 which engages into a groove 42 in the tool holder 30 which extends transverse to the direction of the reciprocating movements.

After the workpieces have traveled past the working position 28 and their nipples B have been cut off, they move with the cylinder to the lower side thereof and can then drop by their own gravity from the grooves 3 into a container below as soon as the roller 23 has run up on the inclined surface 26 at the rear side 22 of the cam member 19 and the workpiece is thereby released from pressure pin 14.

In the particular embodiment of the invention as illustrated, it is assumed that cylinder 1 is intermittently movable in the direction of rotation 18. The nipples are therefore shorn off by the tool 32 when the cylinder is temporarily stopped. For producing this intermittent movement, a Maltese-cross transmission of a conventional type may be provided as a part of the driving mechanism.

Cylinder 1 may, however, also be rotated continuously so that the nipples will be shorn off while the cylinder is moving. In this case, the clamping jaw 36 must be designed so as to be able to yield resiliently to a certain extent in the direction of rotation 18 of the cylinder so that during the extent of the travel of the workpiece past the cutting position which only amounts to an angle of a few degrees, the clamping jaw will not exert any braking action.

When workpieces of a different shape are to be worked upon, the cylinder 1 must be exchanged for one with work-holding grooves 3 which are made in accordance with such different shape. Instead of this, it is also possible to provide a common cylinder with larger grooves into which special work-holding inserts for workpieces of different shapes may be inserted. If workpieces of a different length are to be worked upon, they may be accommodated by exchanging the pressure pins 14 for others of a different length. The reciprocating strokes of the tool holder 30 and the clamping jaw 36 may, however, be uniform for all workpieces regardless of their diameter from which the projecting nipples are to be shorn off.

Although my invention has been illustrated and described with reference to the preferred embodiment thereof, I wish to have it understood that it is in way limited to the details of such embodiment, but is capable of numerous modifications within the scope of the appended claims.

Having thus fully disclosed my invention, what I claim is:

1. An apparatus for removing nipples remaining on the end surfaces of turned workpieces after being cut off on an automatic lathe or the like comprising a drum-shaped cylinder, driving means for rotating said cylinder about its horizontal axis, said cylinder having a plurality of grooves in its peripheral surface equally spaced from each other and extending parallel to said axis and each having a shape in accordance with one of the workpieces so as to receive the same, a feeding position above said cylinder and a cutting position spaced from said feeding position peripherally of said cylinder and located adjacent to said cylinder, said grooves being adapted when said cylinder is turning to travel successively past said feeding position and then past said cutting position, each of said grooves being open to the outside at one end surface of said cylinder where the end surface of a workpiece carrying a nipple is to be located, stop means rigidly secured to said end surface of said cylinder and projecting over the edge of the open end of each of said grooves, a pressure pin movable longitudinally in each of said grooves under spring action in the direction toward said end surface of said cylinder for pressing a workpiece near said cutting position in its axial direction against said stop means, stationary cam means for retracting each of said pressure pins prior to and after said cutting position to permit the workpieces to drop by gravity into said grooves at said feeding position and to permit the workpieces to drop by gravity out of said grooves after said nipples are shorn off at said cutting position, a resilient clamping jaw adapted to clamp each workpiece at said cutting position against the wall of one of said grooves in a radial direction toward said axis, a cutting tool adapted to move in said radial direction so that its cutting edge will move within the common plane of said end surface of said cylinder and the end surface of a workpiece carrying a nipple for shearing off said nipple, and a common drive member operatively connected to said driving means for reciprocating said clamping jaw and said cutting tool in said radial direction.

2. An apparatus as defined in claim 1, further comprising a tool holder for supporting said cutting tool and said clamping jaw, and means for adjusting said cutting tool in said tool holder so that its cutting edge will move within the plane of said end surface of said cylinder.

3. An apparatus as defined in claim 1, further comprising an annular member, means for clamping said annular member upon the other end of said cylinder and coaxially thereto, said annular member having a plurality of bores corresponding to the number of said grooves and coaxially therewith, a slide member slidable within each of said bores, said pressure pin being removably secured to said slide member so as to be exchangeable for a pressure pin of a different length, a spring within said bore acting upon said slide member to press said pressure pin in the direction toward said end surface so as to clamp one of the workpieces between said pressure pin and said stop means, the wall of each of said bores having a slot, a pin mounted in said slide member and extending through said slot to the outside, a roller rotatably mounted on the outer end of said pin and adapted to engage with and to slide along said stationary cam means to retract said slide member and said pressure pin against the action of said spring.

4. An apparatus as defined in claim 1, further comprising a stationary guide member intermediate said feeding and cutting positions for maintaining the workpieces in said grooves between said positions.

5. An apparatus as defined in claim 3, further comprising a drive shaft, said cylinder fitted over the end of said shaft, and a disk rigidly secured to said drive shaft and forming a flange thereon and means for clamping said cylinder in a fixed rotary position with said end surface thereof against said disk, said disk also forming said stop means for the open ends of all of said grooves in said cylinder.

6. An apparatus as defined in claim 1, further comprising a feed channel for the workpieces extending above said cylinder and radially to the axis of said cylinder at said feeding position.

7. An apparatus as defined in claim 1, in which said driving means are adapted to rotate said cylinder intermittently.

8. An apparatus as defined in claim 1, in which said driving means are adapted to rotate said cylinder continuously.

References Cited by the Examiner
UNITED STATES PATENTS
1,883,567 10/1932 Christman.

FOREIGN PATENTS
486,455 11/1953 Italy.

ANDREW R. JUHASZ, *Primary Examiner.*